(12) United States Patent
Noguchi et al.

(10) Patent No.: US 6,941,832 B2
(45) Date of Patent: Sep. 13, 2005

(54) INJECTION MOLDED RESIN GEAR, INJECTION MOLDED RESIN ROTATING BODY, AND INJECTION MOLDED ARTICLE

(75) Inventors: Koji Noguchi, Saitama (JP); Tadashi Noguchi, Saitama (JP)

(73) Assignee: Enplas Corporation, Saitama (JP)

( * ) Notice: Subject to any disclaimer, the term of this patent is extended or adjusted under 35 U.S.C. 154(b) by 75 days.

(21) Appl. No.: 10/340,270

(22) Filed: Jan. 10, 2003

(65) Prior Publication Data

US 2003/0131678 A1 Jul. 17, 2003

(30) Foreign Application Priority Data

Jan. 15, 2002 (JP) .................................. P2002-005954
Dec. 5, 2002 (JP) .................................. P2002-353355

(51) Int. Cl.⁷ ............................................. F16H 55/14
(52) U.S. Cl. .................. 74/461; 74/DIG. 10; 264/478; 264/645; 29/893.1
(58) Field of Search .......................... 74/431, 460, 461, 74/DIG. 10; 264/478, 645; 29/893.1

(56) References Cited

U.S. PATENT DOCUMENTS

| | | | | |
|---|---|---|---|---|
| 5,207,112 A | * | 5/1993 | Sweetland et al. | ............. 74/460 |
| 5,606,890 A | * | 3/1997 | Luckas | ................ 74/411 |
| 6,000,295 A | * | 12/1999 | Kimizuka | ................ 74/434 |
| 6,070,484 A | * | 6/2000 | Sakamaki | ................ 74/434 |
| 6,181,899 B1 | * | 1/2001 | Fukuchi | ................ 399/117 |
| 2001/0002512 A1 | * | 6/2001 | Fukuchi | ................ 29/893.35 |
| 2001/0039730 A1 | * | 11/2001 | Fujita et al. | ............. 29/893.35 |

FOREIGN PATENT DOCUMENTS

| | | | |
|---|---|---|---|
| JP | 55063054 | * | 5/1980 |
| JP | 02072259 | * | 3/1990 |

OTHER PUBLICATIONS

Japanese Patent Laid–Open No. 49–36755 (published on Apr. 5, 1974).
Japanese Patent Laid–Open No. 2001–123986 (published on May 8, 2001).
Japanese Patent Laid–Open No. 2001–353753 (published Dec. 25, 2001).

* cited by examiner

Primary Examiner—David M. Fenstermacher
(74) Attorney, Agent, or Firm—Bachman & LaPointe, P.C.

(57) ABSTRACT

An injection molded resin gear 1 includes a rim 4, a hub 3 and a web 5 which connects the rim 4 to the hub 3. A plurality of ribs 7 for guiding a molten resin, which is injected from pin point gates 8, to the hub 3 protrude from the outer periphery of the hub 3 on one side of the web 5 so as to correspond to the pin point gates 8. The ribs 7 are formed so as to be recessed from the side face 10 of the hub 3. In the connecting portions of the ribs 7 to the hub 3, fillet portions 12 are formed for smoothly guiding the flow of the resin from the hub 3 toward the web 5 when the injection molded resin gear 1 is formed.

20 Claims, 12 Drawing Sheets

ONE REVOLUTION OF GEAR

ONE REVOLUTION OF GEAR

INJECTION MOLDED RESIN GEAR, INJECTION MOLDED RESIN ROTATING BODY, AND INJECTION MOLDED ARTICLE

BACKGROUND OF THE INVENTION

1. Field of the Invention

The present invention generally relates to a gear of a resin for use in power transmission devices for precision instruments, such as color copying machines, color printers and video tape recorders, various automotive parts, industrial equipments and so forth. More specifically, the invention relates to a resin gear which is formed by an injection molding. The present invention also relates to an injection molded resin gear and an injection molded resin rotating body, such as an injection molded resin roller or an injection molded resin pulley. Moreover, the present invention relates to an injection molded article which is used as a dynamic rotating body, such as an injection molded resin gear or an injection molded resin roller, or a static shaft supporting member.

2. Description of the Prior Art

For example, tandem type color copying machines and color printers are designed to sequentially carry out steps of forming images of black (K), magenta (M), cyanogen (C) and yellow (Y) in a direction in which a transfer material, such as a copy paper, is carried, to sequentially superpose and transfer images of different colors to the transfer material to print a desired color image on the transfer material. In such color copying machines and color printers, an image forming unit for each color (K, M, C, Y) is connected to a motor via gears to be operated by the driving force of the motor. Therefore, in order to enable a high quality color print, it is required to precisely operate the image forming unit for each color (K, M, C, Y) to precisely transfer each color image to the transfer material. For that reason, the precision of gears for transmitting the rotation of the motor to the image forming unit is important. That is, if the precision of the gears is bad, the rotation of the motor is not precisely transmitted to the image forming unit, so that operation failure, such as irregular rotation, is caused in the image forming unit, thereby causing print failure, such as color deviation.

In addition, users have requested to reduce the size, weight and price of the above described color copying machines and color printers and to reduce operation noises thereof.

Therefore, in recent years, the above described color copying machines and color printers have widely used injection molded resin gears, which can be more precise than cut metal gears and which can more greatly reduce weight and operation noises than the metal gears, as gears for transmitting the rotation of a motor to an image forming unit.

FIG. 17 shows an example of a conventional injection molded resin gear. The injection molded resin gear 31 shown in FIG. 17 is formed by injecting a molten resin into a cavity from three pin point gates 35, which are arranged around the center of the side of a web 34 for connecting a rim 32 and a hub 33 (see, e.g., Japanese Patent Laid-Open No. 49-36755).

FIG. 18 shows another example of a conventional injection molded resin gear. The injection molded resin gear 41 shown in FIG. 18 is formed by applying a method for forming an impeller for a circumferential current pump, which is disclosed in Japanese Patent Laid-Open No. 2001-123986. This gear 41 is formed by injecting a resin from a ring-shaped gate 42 which allows the resin to flow outwardly and inwardly in radial directions of a web 43 so as to prevent the production of weld lines.

FIG. 19 shows a further example of a conventional injection molded resin gear. The injection molded resin gear 51 shown in FIG. 19 is formed by injecting a resin from a disk gate 52 which allows the resin to radially flow from a hub 53 toward a web 54 so as to effectively prevent the production of weld lines (see, e.g., Japanese Patent Laid-Open No. 2001-353753).

However, if the resin is injected into the cavity from the three pin point gates 35 as shown in FIG. 17, the resin injected from each pin point gate 35 flows into each other in substantially middle portions between adjacent pin point gates 35 and 35 as shown by arrows to produce weld lines 36. If the weld lines 36 are produced in an injection molded article (the injection molded resin gear 31), there are some cases where the weld lines 36 do not only have a bad influence on the precision of the tooth profile, but they also have a bad influence on the strength of the gear. Therefore, the injection molded resin gear 31 shown in FIG. 17 is unsuited for a power transmission device for a color copying machine or the like.

In addition, in the injection molded resin gear 41 formed by using the ring-shaped gate 42 as shown in FIG. 18, the amount of useless material used in the gate and runner is larger than that in the above described injection molded resin gear 31 using the pin point gates 35, so that there is a problem in that production costs are high.

Moreover, the disk gate 52 shown in FIG. 19 is arranged at the center of the injection molded resin gear 51. As a result, an axial die 56 for forming an axial hole 55 can not securely be supported on the side of a top die 57, and the axial die 56 is easily moved by the injection pressure, so that there is a problem in that the axial hole 55 of the injection molded resin gear 51 is easy to be eccentric to have a bad influence on the results of measurement of run out of a tip circle.

SUMMARY OF THE INVENTION

It is therefore an object of the present invention to eliminate the aforementioned problems and to provide a precision and inexpensive injection molded resin gear as compared with conventional injection molded resin gears.

It is another object of the present invention to provide a precision and inexpensive injection molded resin rotating body, such as an injection molded resin roller or an injection molded resin pulley, which is used for a power transmission mechanism similar to an injection molded resin gear.

It is a further object of the present invention to provide a precision and inexpensive injection molded article, such as a shaft supporting member, which substantially has the same shape of an injection molded resin roller and which can support thereon a movable shaft or a static shaft.

In order to accomplish the aforementioned and other objects, according to one aspect of the present invention, an injection molded resin gear comprises a rim, a hub and a web which connects the rim to the hub, wherein a rib for guiding a molten resin, which is injected from a pin point gate, to the hub protrudes from an outer periphery of the hub on one side of the web so as to correspond to the pin point gate.

In this injection molded resin gear, a fillet portion for allowing the resin to smoothly flow from the hub to the web may be formed on a connecting portion of the rib to the hub. The rib has a radial length which is preferably 6W or less, more preferably 3W or less, assuming that a width of the rib W.

According to another aspect of the present invention, an injection molded resin gear comprises a rim, a hub and a web which connects the rim to the hub, wherein a ring-shaped portion for facing a pin point gate protrudes from an outer periphery of the hub on at least one side of the web so that a thick-wall portion for guiding a molten resin, which is injected from the pin point gate, to the hub is formed on an end portion of the web on the side of the hub.

According to another aspect of the present invention, an injection molded resin rotating body comprises an outer cylindrical portion, an inner cylindrical portion and a disk-shaped portion which connects the outer cylindrical portion to the inner cylindrical portion, wherein a rib for guiding a molten resin, which is injected from a pin point gate, to the inner cylindrical portion protrudes from an outer periphery of the inner cylindrical portion on one side of the disk-shaped portion so as to correspond to the pin point gate.

According to another aspect of the present invention, an injection molded resin rotating body comprises an outer cylindrical portion, an inner cylindrical portion and a disk-shaped portion which connects the outer cylindrical portion to the inner cylindrical portion, wherein a ring-shaped portion for facing a pin point gate protrudes from an outer periphery of the inner cylindrical portion on at least one side of the disk-shaped portion, so that a thick-wall portion for guiding a molten resin, which is injected from the pin point gate, to the inner cylindrical portion is formed on an end portion of the disk-shaped portion on the side of the inner cylindrical portion.

According to another aspect of the present invention, an injection molded article comprises an outer cylindrical portion, an inner cylindrical portion and a disk-shaped portion which connects the outer cylindrical portion to the inner cylindrical portion, wherein a rib for guiding a molten resin, which is injected from a pin point gate, to the inner cylindrical portion protrudes from an outer periphery of the inner cylindrical portion on one side of the disk-shaped portion so as to correspond to the pinpoint gate.

According to a further aspect of the present invention, an injection molded article comprises an outer cylindrical portion, an inner cylindrical portion and a disk-shaped portion which connects the outer cylindrical portion to the inner cylindrical portion, wherein a ring-shaped portion for facing a pin point gate protrudes from an outer periphery of the inner cylindrical portion on at least one side of the disk-shaped portion, so that a thick-wall portion for guiding a molten resin, which is injected from the pin point gate, to the inner cylindrical portion is formed on an end portion of the disk-shaped portion on the side of the inner cylindrical portion.

According to a still further aspect of the present invention, an injection molded article comprises: an inner cylindrical portion; an outer cylindrical portion which receives the inner cylindrical portion; a disk-shaped portion which extends from the inner cylindrical portion to the outer cylindrical portion for connecting the inner cylindrical portion to the outer cylindrical portion; and a protruding portion which protrudes from the inner cylindrical portion toward the outer cylindrical portion in a radial direction of the injection molded article, the protruding portion extending from the disk-shaped portion in an axial direction of the injection molded article so that a face of the protruding portion opposite to the disk-shaped portion is associated with the inner cylindrical portion for defining a recessed portion adjacent to an axial end portion of the inner cylindrical portion.

In this injection molded article, the protruding portion may be a rib which extends in axial directions of the inner cylindrical portion. In this case, the injection molded article may further comprise a fillet portion provided in a connecting portion in which the rib is connected to the inner cylindrical portion. The radial length of the rib in the radial direction of the injection molded article is preferably six times or less, more preferably three times or less, as large as a width of the rib. In addition, the protruding portion is preferably arranged so as to face a pin point gate when a molten resin is injected into a die via the pin point gate to form the injection molded article. Moreover, the recessed portion preferably defines a space for receiving a pin point gate when a molten resin is injected into a die via the pin point gate to form the injection molded article.

In the above described injection molded article, the protruding portion may comprise a plurality of ribs which are arranged at regular intervals in circumferential directions of the inner cylindrical portion so as to extend in axial directions of the inner cylindrical portion. In this case, the injection molded article may further comprise a fillet portion provided in a connecting portion in which each of the plurality of ribs is connected to the inner cylindrical portion. Each of the plurality of ribs may have a substantially C-shaped cross section or a substantially rectangular cross section. The plurality of ribs are preferably arranged so as to face a plurality of pin point gates when a molten resin is injected into a die via the pin point gates to form the injection molded article.

In the above described injection molded article, the protruding portion may be a ring-shaped portion which extends from the inner cylindrical portion toward the outer cylindrical portion in radial directions of the injection molded article so as to form a thick-wall portion on the disk-shaped portion. In this case, a face of the ring-shaped portion opposite to the disk-shaped portion preferably faces a pin point gate when a molten resin is injected into a die via the pin point gate to form the injection molded article. The face of the ring-shaped portion opposite to the disk-shaped portion may be inclined in accordance with a tilt angle of the pin point gate.

The above described injection molded article may be an injection molded resin gear rotated by a rotating shaft and further comprise a plurality of teeth arranged on an outer periphery of the outer cylindrical portion. Alternatively, the injection molded article may be an injection molded resin rotating body which is rotated by a rotating shaft.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, particularly to FIGS. 1 to 16, the preferred embodiments of the present invention will be described below in detail.

[First Preferred Embodiment]

Figure 1:
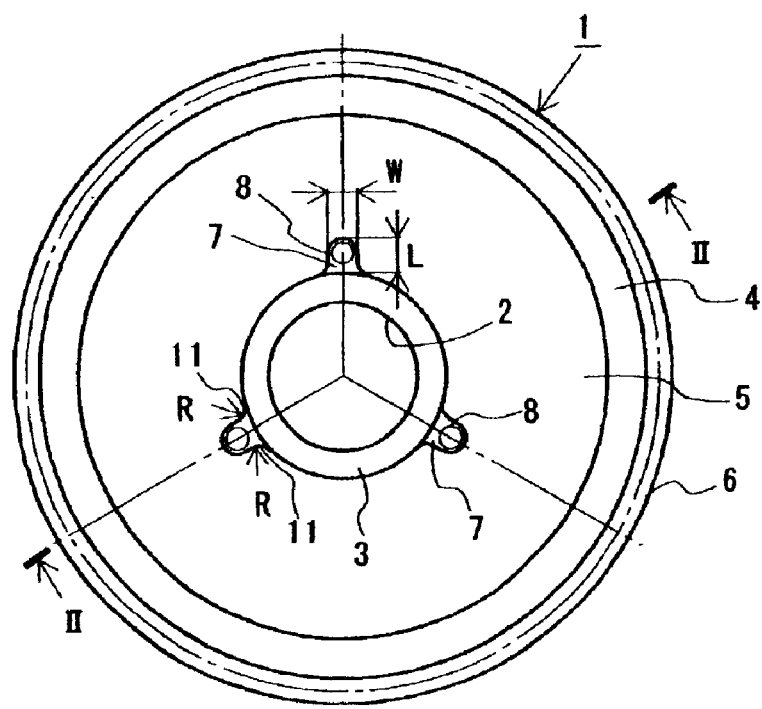
FIG. 1 is a side view of the first preferred embodiment of an injection molded resin gear according to the present invention.
Figure 2:
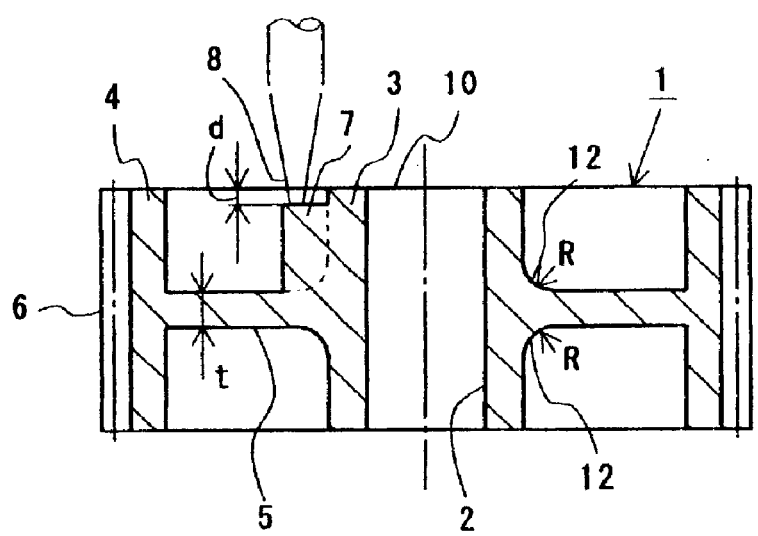
FIG. 2 is a sectional view of the injection molded resin gear, which is taken along line II—II of FIG. 1.

FIGS. 1 and 2 show the first preferred embodiment of an injection molded resin gear 1 according to the present invention, FIG. 1 being a side view of the injection molded resin gear 1 and FIG. 2 being a sectional view taken along line II—II of FIG. 1.

The injection molded resin gear 1 shown in these figures is formed by injecting a molten resin material, such as polyacetal, polyamide, polyphenylene sulfide or polybutylene terephthalate, into a cavity of a die from pin point gates.

The injection molded resin gear 1 comprises a substantially cylindrical hub (inner cylindrical portion) 3 having an axial hole 2, a substantially cylindrical rim (outer cylindrical portion) 4 arranged concentrically with the hub 3, and a web (disk-shaped portion) 5 connecting the hub 3 to the rim 4 in a substantially central portion in face width directions. On the outer periphery of the rim 4, a large number of teeth 6 are formed.

On the outer periphery of the hub 3 on one side of the web 5 (on the upper face of the web 5 in the figure), three ribs 7 are formed at regular intervals. The ribs 7 serve to lead a molten resin, which is injected from the pin point gates 8, to the hub 3. The ribs 7 are arranged so as to correspond to the pin point gates 8. The radial length L of each rib 7 is set so as to be capable of leading the molten resin, which is injected from a corresponding one of the pinpoint gates 8, toward the hub 3. The optimum radial length of each rib 7 is suitably set in accordance with conditions, such as the outside diameter of the gear and the kind of the resin material. Assuming that the width of the rib is W, the radial length L is set to be 6W or less, preferably 3W or less.

The height of each rib 7 is so set that the rib 7 is recessed from the side face 10 of the hub 3 by a predetermined dimension d in order to prevent burrs from protruding from the side face 10 of the hub 3 when the pin point gates 8 are cut. If the rib 7 is thus recessed from the side face 10 of the hub 3, after the pin point gates 8 are cut, it is not required to chip pin point gate impressions, so that it is possible to decrease the number of processing steps.

In the connecting portion of the hub 3 to the web 5 and in the connecting portion of the rib 7 to the hub 3, fillet portions 11 and 12 having smoothly curved surfaces (curved surfaces having a radial of R) are formed. The fillet portions 11 and 12 have the function of causing the molten resin, which is injected into the cavity, to smoothly flow from the hub 3 toward the web 5. Assuming that the thickness of the web 5 is t, the radius R of curvature of each curved surface of the fillet portions 11 and 12 is set to be about 0.5 t.

Figure 3:
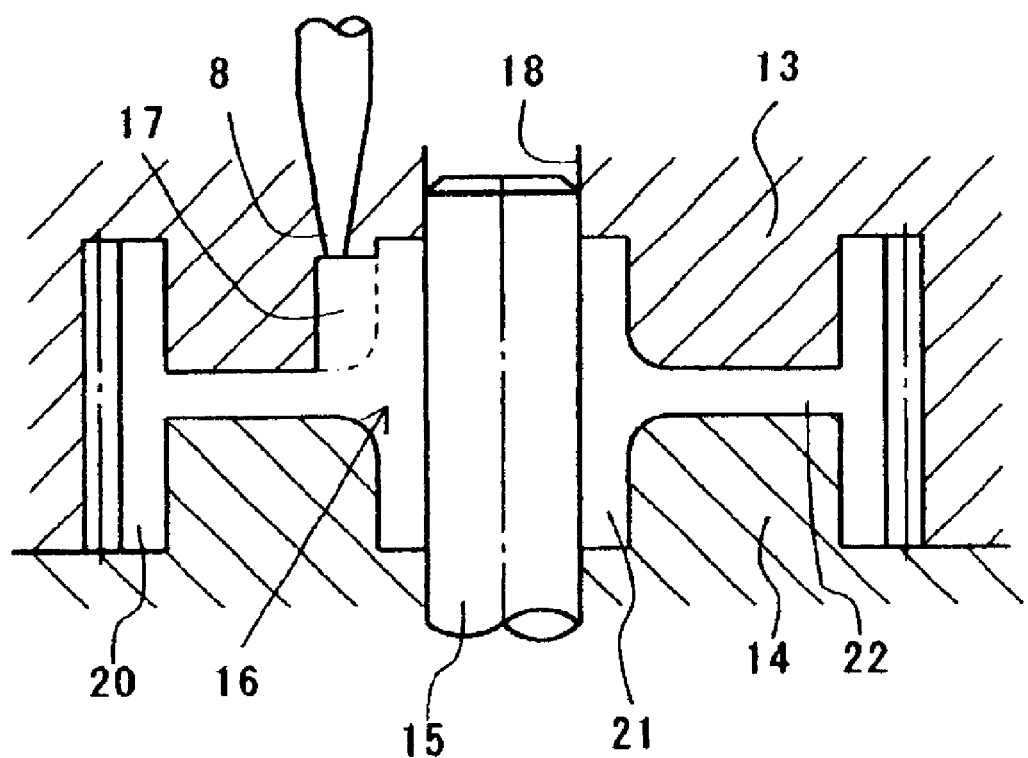
FIG. 3 is a sectional view schematically showing an injection molding die for forming the injection molded resin gear of FIG. 1.

FIG. 3 is a sectional view schematically showing the shape of a die for forming the injection molded resin gear 1 in this preferred embodiment. For convenience of explanation, an upper die in the figure will be hereinafter referred to as a top die 13, a lower die in the figure will be hereinafter referred to as a bottom die 14, and a die for forming the axial hole 2 will be hereinafter referred to as a center pin 15.

The top die 13 has pin point gates 8, each of which is open to a rib forming portion 17 of a cavity 16, and a hole 18 which receives the center pin 15. The cavity 16 formed by the top die 13, bottom die 14 and center pin 15 comprises a rim forming portion 20, a hub forming portion 21, a web forming portion 22 and the rib forming portion 17.

Figure 4:
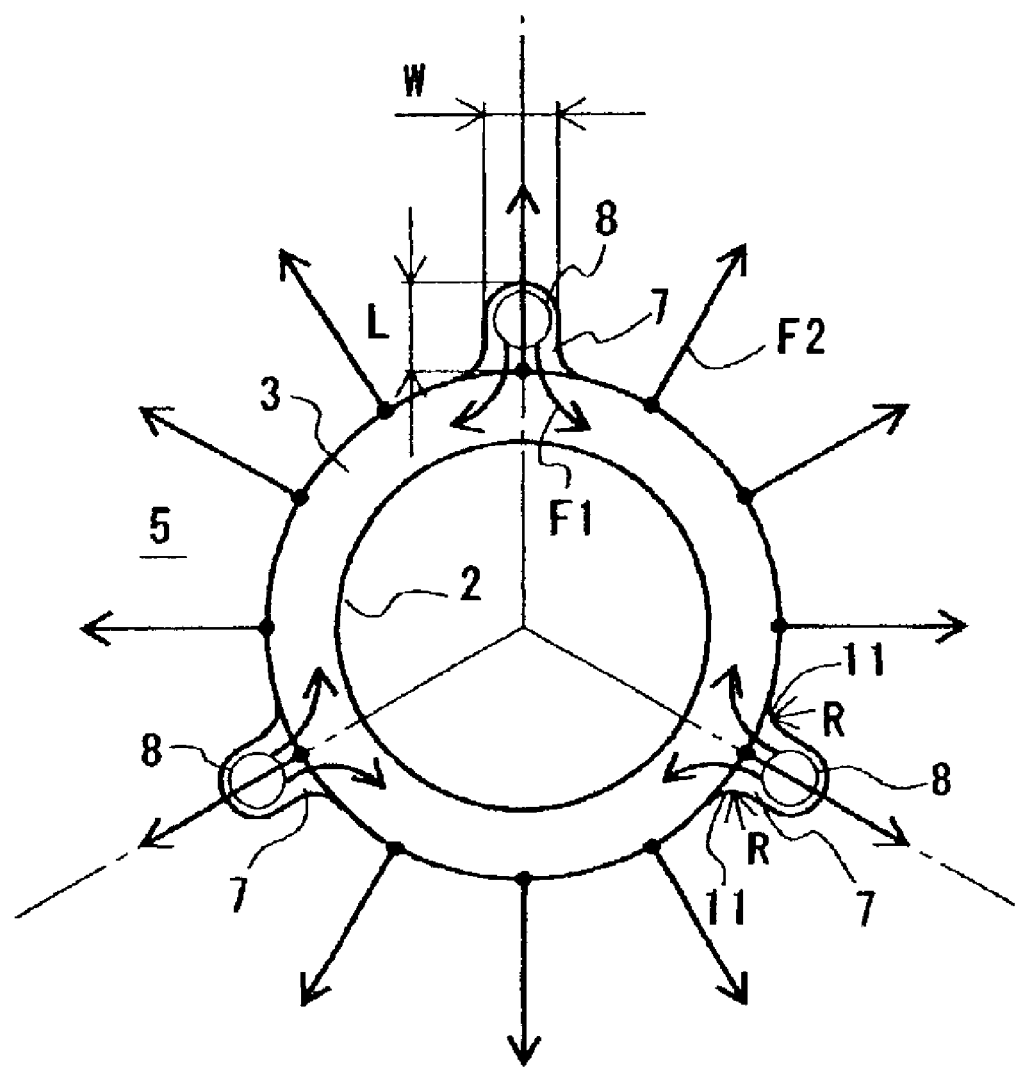
FIG. 4 is an illustration showing the flow state of a resin in the die of FIG. 3.

In such a die structure, the molten resin injected from the pin point gates 8 is guided from the rib forming portion 17 to the hub forming portion 21 as shown in FIG. 4 (see the flow of the molten resin shown by arrows F1), and filled in the hub forming portion 21. Thereafter, the molten resin radially flows from the hub forming portion 21 toward the web forming portion 22, and smoothly flows from the web forming portion 22 to the rim forming portion 20 (see the flow of the molten resin shown by arrows F2). Then, after the molten resin filled in the cavity 16 is solidified, the top die 13 is separated from the bottom die 14 in FIG. 3, and the center pin 15 moves downwards in the figure. Then, the injection molded resin gear 1 shown in FIGS. 1 and 2 is released from the bottom die 14 by means of an eject pin (not shown).

In the injection molded resin gear 1 formed by the above described die structure, the molten resin flows outwardly in radial directions and substantially uniformly from the hub 3 during the injection molding, so that the production of weld lines decreases and roundness is precise.

In the injection molded resin gear 1 formed by the above described die structure, the center pin 15 for forming the axial hole 2 is slidably supported on the hole 18 of the top die 13, and the run out of the center pin 15 is not caused by the injection molding pressure, so that the axial hole 2 is precisely formed. Therefore, the injection molded resin gear 1 in this preferred embodiment can reduce the run out of tip circle and can precisely transmit rotation.

Figure 5A:
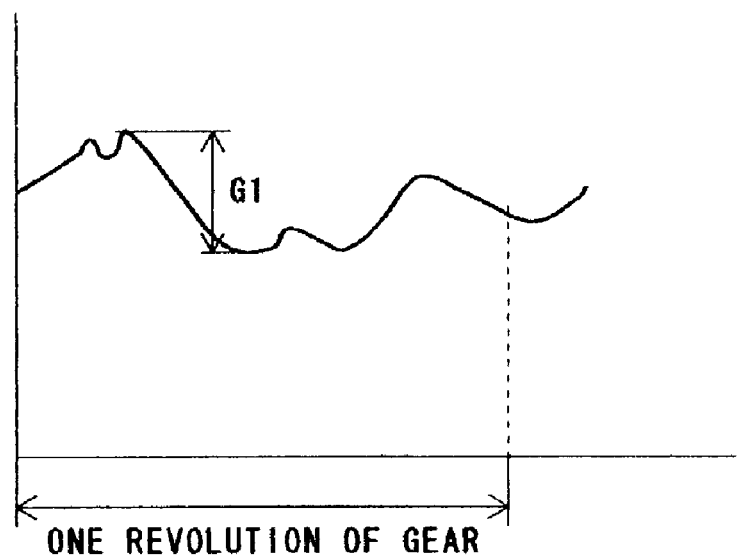
FIGS. 5A and 5B are graphs showing the results of working tests between both tooth flanks, FIG. 5A being a recording chart of working errors between both tooth flanks in an injection molded resin gear according to the present invention, and FIG. 5B being a recording chart of working errors between both tooth flanks in a conventional injection molded resin gear.
Figure 5B:
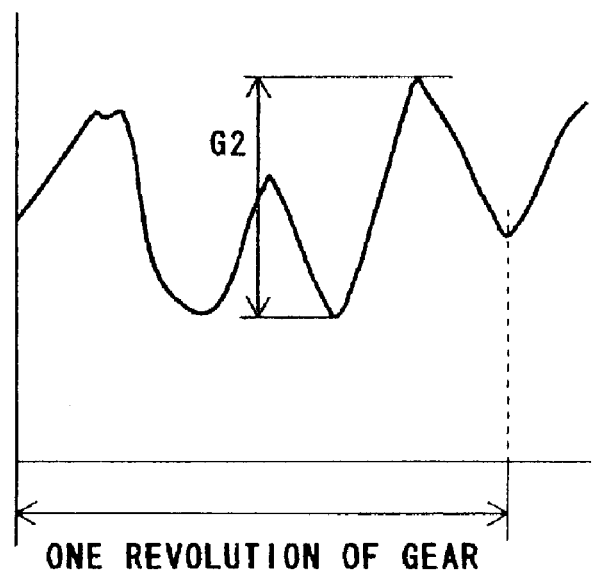
Figure 17:
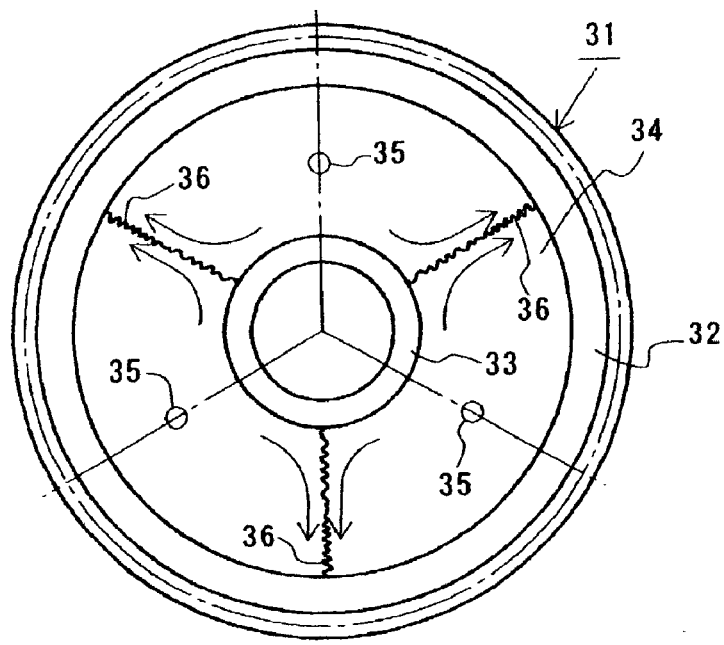
FIG. 17 is a side view of an example of a conventional injection molded resin gear.
Figure 18:
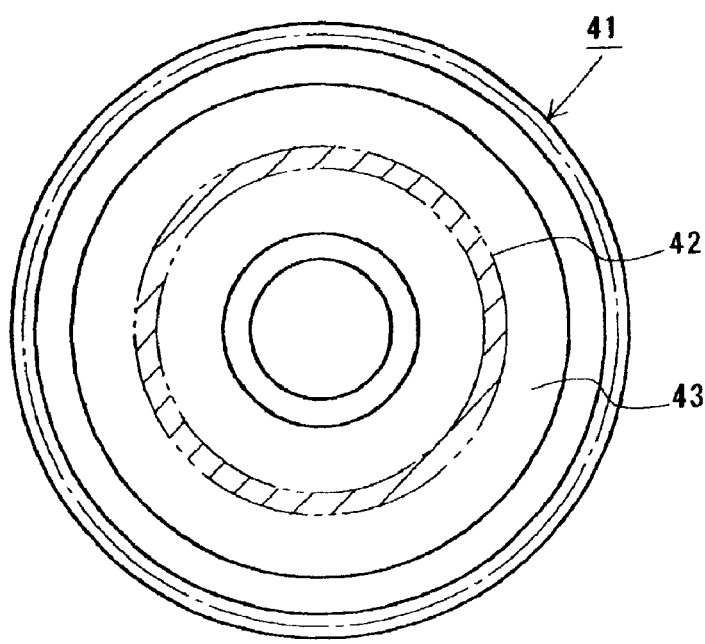
FIG. 18 is a side view of another example of a conventional injection molded resin gear.
Figure 19:
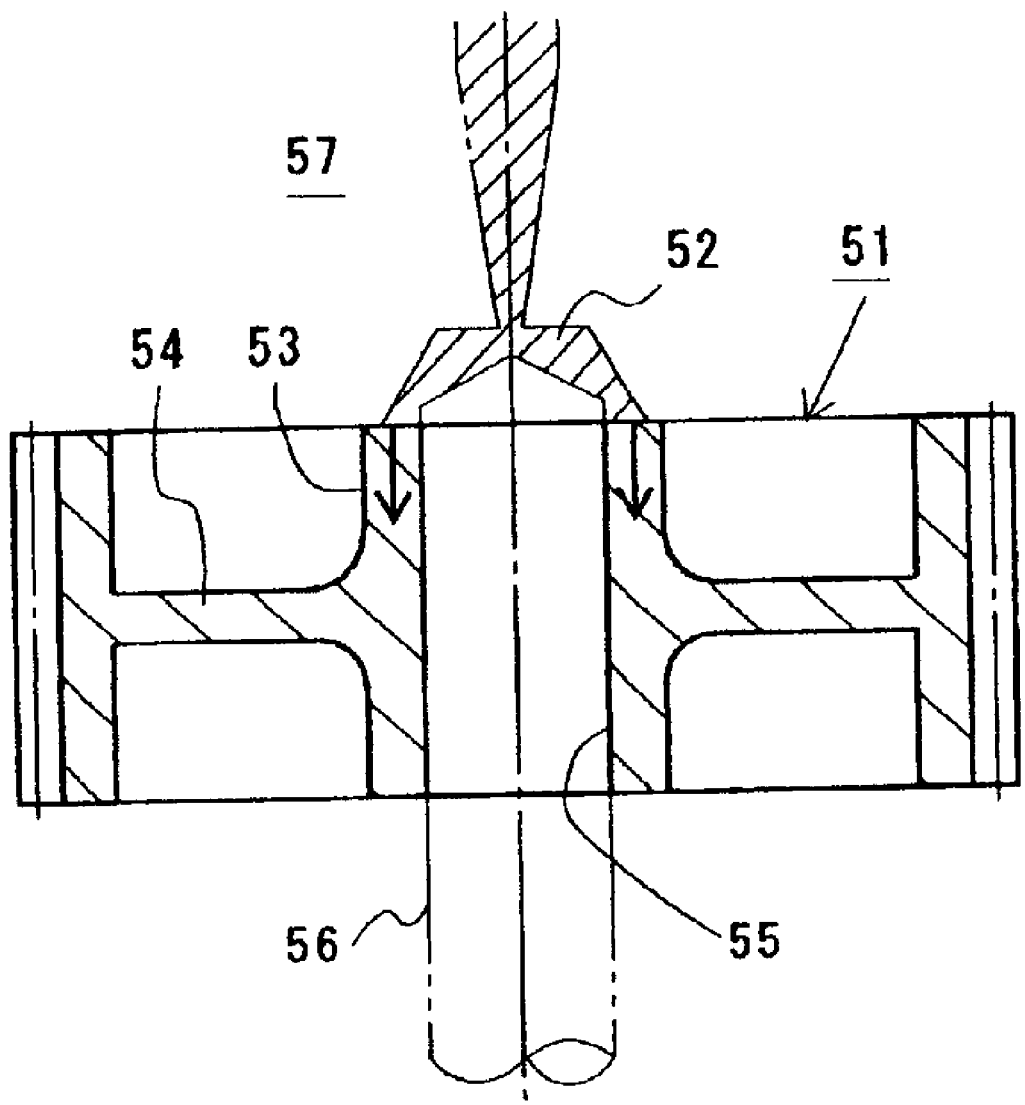
FIG. 19 is a sectional view of a further example of a conventional injection molded resin gear.

FIGS. 5A and 5B show the comparison of the precision of the injection molded resin gear 1 in this preferred embodiment (FIG. 5A) with the precision of the conventional injection molded resin gear (the injection molded resin gear shown in FIG. 17), and show the results of measurement in working tests between both tooth flanks. The shown charts notice the total working errors to schematically show them.

In the results of measurement in the working test between both tooth flanks with respect to the conventional injection molded resin gear as shown in FIG. 5B, the roundness is deteriorated by the influence of weld lines and so forth. Therefore, the line showing the results of measurement (the recording chart of working errors between both tooth flanks) suddenly and greatly varies, and the total working error G2 between both tooth flanks is large. On the other hand, with respect to the injection molded resin gear 1 in this preferred embodiment, as shown in FIG. 5A, the recording chart of working errors between both tooth flanks varies smoothly and small, and the total working error G1 between both tooth flanks is small. Furthermore, the ratio (G1/G2) of the total working errors between both tooth flanks was about 6/10.

As described above, according to this preferred embodiment, the ribs 7 formed on the outer periphery of the hub 3 on one side of the web 5 are designed to guide the injected molten resin toward the hub 3 to allow the resin to uniformly flow from the hub 3 toward the web 5, so that it is possible to form a precision injection molded resin gear 1 having no weld lines.

As described above, according to this preferred embodiment, the molten resin is injected from the pin point gates 8, so that the amount of useless material can be smaller than that in the use of the ring gate to reduce the production costs for the injection molded resin gear 1.

Figure 6:
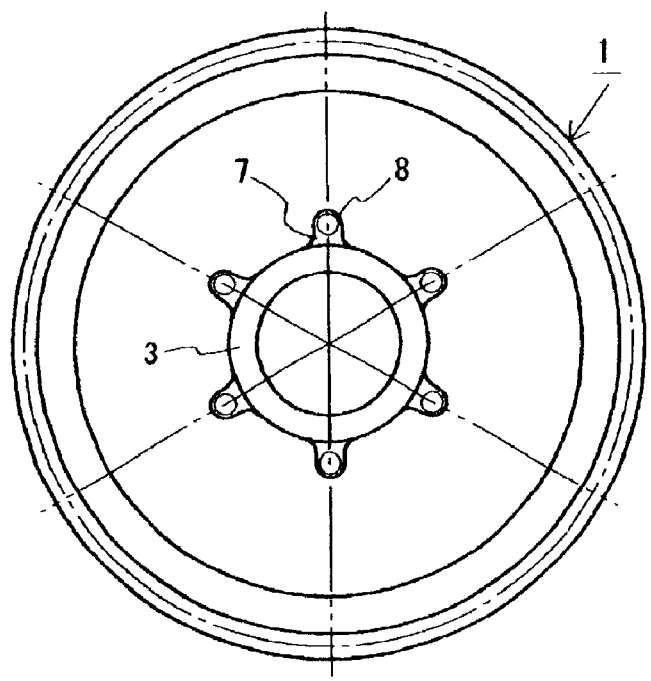
FIG. 6 is a side view of a first modified example of an injection molded resin gear in the first preferred embodiment.

Furthermore, the number of the ribs 7 maybe at least one if the molten resin injected from the pin point gates 8 can be lead to the hub 3 by the ribs 7. However, if the number of the ribs 7 is four or more, e.g., if the number of the ribs is six as shown in FIG. 6, the flow of the molten resin can be smoother during the injection molding, so that it is possible to provide a higher precision injection molded resin gear 1.

Figure 7:
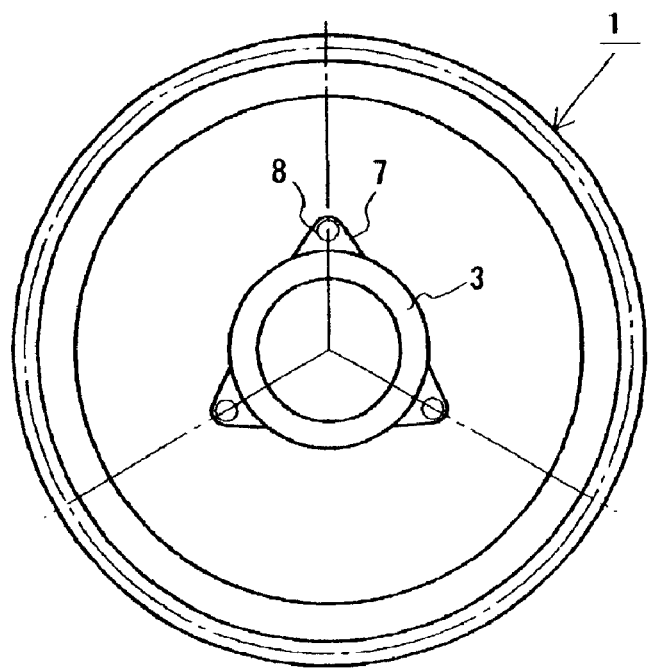
FIG. 7 is a side view of a second modified example of an injection molded resin gear in the first preferred embodiment.

The shape of the rib 7 should not be limited to the shape in the above described preferred embodiment. If the molten resin injected from the pin point gates 8 can be lead to the hub 3, the plane shape of the rib 7 may be, e.g., substantially triangular, as shown in FIG. 7.

The shape of the fillet portion 11 on the connecting portion of the rib 7 to the hub 3, and the shape of the fillet portion 12 on the connecting portion of the hub 3 to the web 5 should not be limited to the R-curved surface shown in FIGS. 1, 2 and 4 if the resin can smoothly flow. For example, the fillet portions 11 and 12 may have a substantially triangular shape like a C-shaped fillet.

Figure 8:
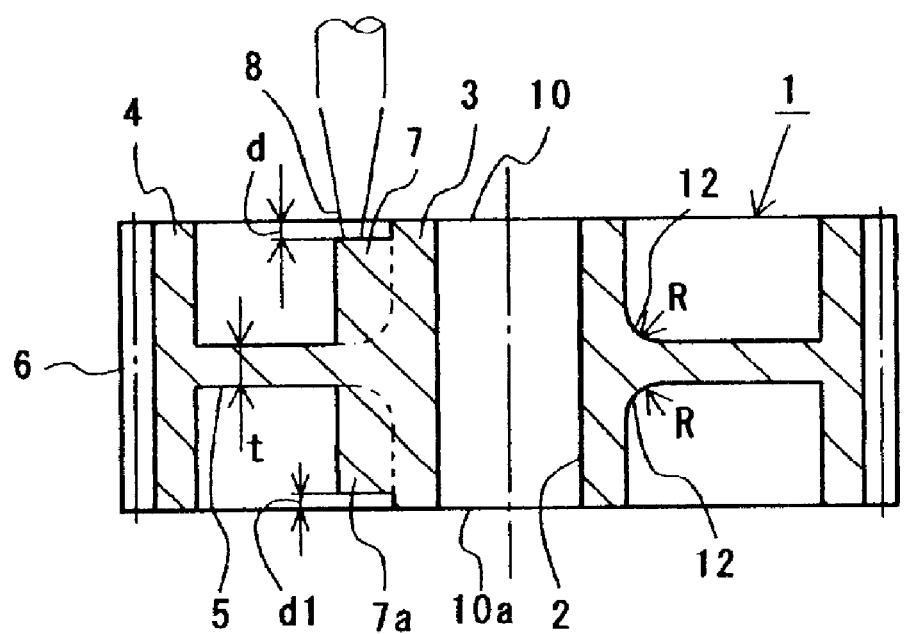
FIG. 8 is a sectional view of a third modified example of an injection molded resin gear in the first preferred embodiment.

In addition, as shown in FIG. 8, ribs 7a similar to the ribs 7 may be formed on the other side 10a of the web 5 (on the lower side in the figure) at positions corresponding to the ribs 7 formed on the one side 10 of the web 5 (on the upper side in the figure). Thus, the molten resin injected from the pin point gates 8 is easy to flow from the ribs 7a toward the hub 3, and the molten resin injected from the pin point gates 8 can be more effectively lead toward the hub 3 than the embodiment shown in FIG. 2. Furthermore, as shown in FIG. 8, the injection molded resin gear 1 is preferably symmetric with respect to a horizontally taken plane including the center of the web 5, but the dimension d from the side face 10 to the end portion of the rib 7 may be different from the dimension d1 from the side face 10a to the end portion of the rib 7a.

[Second Preferred Embodiment]

Figure 9:
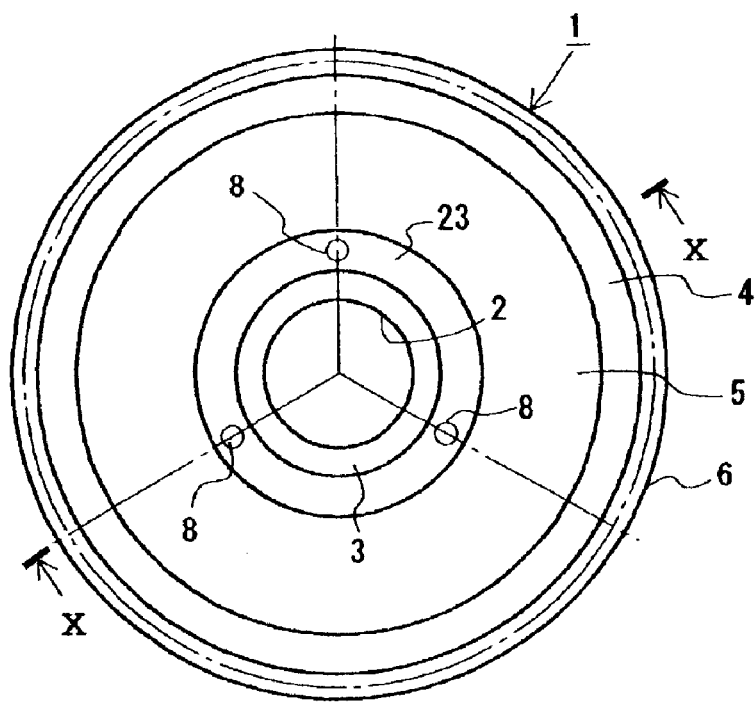
FIG. 9 is a side view of the second preferred embodiment of an injection molded resin gear according to the present invention.
Figure 10:
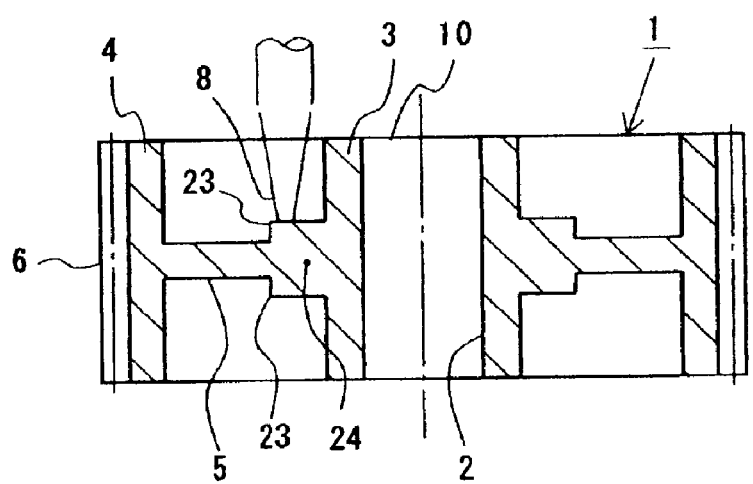
FIG. 10 is a sectional view of the injection molded resin gear, which is taken along line X—X of FIG. 9.

FIGS. 9 and 10 show the second preferred embodiment of an injection molded resin gear 1 according to the present invention. The same reference numbers as those in the above described first preferred embodiment are given to the same or similar portions as or to those in the above described first preferred embodiment, and the descriptions thereof will be omitted.

As shown in these figures, ring-shaped portions 23 being substantially annular stepped portions protrude from the outer periphery of the hub 3 on both sides of the web 5. The ring-shaped portions 23 extend so as to face the pin point gates 8. As a result, a thick-wall portion 24 which is thicker than the web 5 is formed on the end portion of the web 5 on the side of the hub 3.

According to this preferred embodiment with this construction, the molten resin injected from the pin point gates 8 flows into the thick-wall portion 24 which is thicker than the web 5, and is guided by the thick-wall portion 24 to flow into the hub 3. Thereafter, the molten resin substantially uniformly flows from the thick-wall portion 24 outwardly in radial directions of the web 5. As a result, according to this preferred embodiment, it is possible to form a precision injection molded resin gear 1 having no weld lines.

In this preferred embodiment similar to the above described first preferred embodiment, the molten resin is injected from the pinpoint gates 8. Therefore, the amount of useless material is smaller than that in the use of the ring gate, so that it is possible to reduce the production costs for the injection molded resin gear 1.

In this preferred embodiment, the ring-shaped portions 23 are uniformly formed on both sides of the web 5, so that it is difficult to cause abnormal deformation, such as warp, of the web 5.

In this preferred embodiment, the thick-wall portion 24 serves to smoothly guide the molten resin, which is injected from the pin point gates 8, toward the hub 3. Therefore, in order to inhibit the shrinkage of the web 5 inwardly in radial directions, the thickness and outside dimension of the thick-wall portion are determined so as to be as small as possible.

Figure 11:
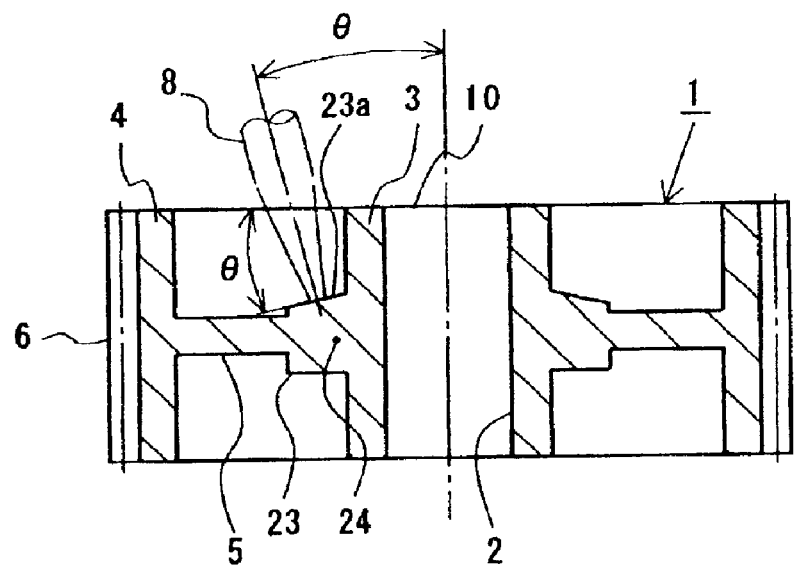
FIG. 11 is a sectional view of a first modified example of an injection molded resin gear in the second preferred embodiment.

FIG. 11 shows a first modified example in this preferred embodiment. In the injection molded resin gear 1 shown in this figure, a ring-shaped portion 23a formed on the upper side face of the web 5 so as to face the pin point gates 8 tilts so as to correspond to the tilt angle θ of the pin point gates 8. That is, the surface of the ring-shaped portion 23a facing the pin point gates 8 in the upper portion in the figure is formed on the tilt (by the tilt angle θ) so as to be perpendicular to the injecting direction of the pin point gates 8, and the base portion of the ring-shaped portion 23a on the side of the hub 3 is formed so as to be thicker.

According to the first modified example with this construction, of course, it is possible to obtain the above described effects in this preferred embodiment. In addition, since the opening portions of the pin point gates 8 can be closer to the hub 3, the outside dimension of the ring-shaped portions 23a and 23 can be smaller, so that the molten resin injected from the pin point gates 8 can be more easily guided toward the hub 3.

According to this modified example, since the top face of the ring-shaped portion 23a is formed so as to be perpendicular to the injecting direction of the pin point gates 8, the injection molded resin gear 2 being a molded article can be smoothly released from the pin point gates 8 during the mold releasing, so that it is possible to obtain a good releasing face.

Figure 12:
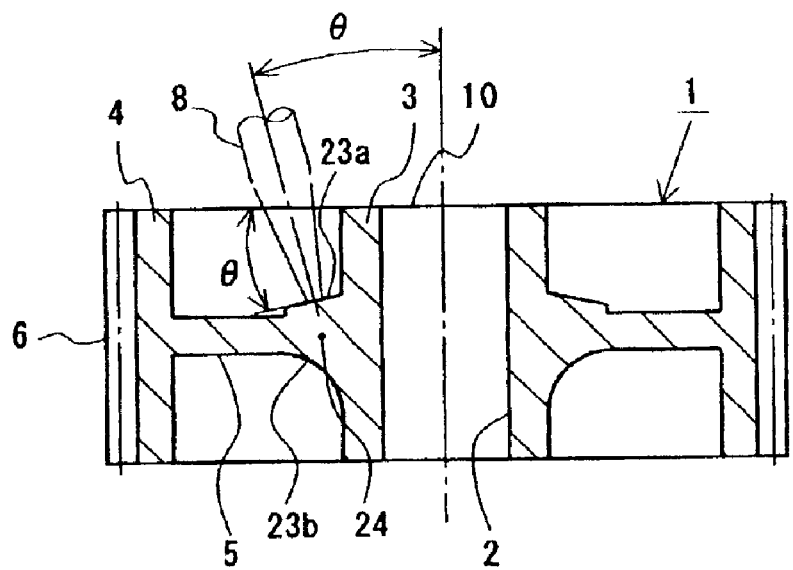
FIG. 12 is a sectional view of a second modified example of an injection molded resin gear in the second preferred embodiment.

FIG. 12 shows a second modified example in this preferred embodiment. The injection molded resin gear 1 shown in this figure is a modified example of the above described first modified example. In the second modified example, the ring-shaped portion 23 having a substantially rectangular cross section arranged on the lower side of the web 5 in FIG. 11 is changed to a ring-shaped portion 23b having a substantially circular-arc-shaped cross section. In this modified example, it is possible to obtain the same effects as those in the above described first modified example. As this modified example, if the lower portion of the thick-wall portion is formed so as to have a substantially circular arc-shaped cross section, the flow of the molten resin can be more smooth.

Figure 13:
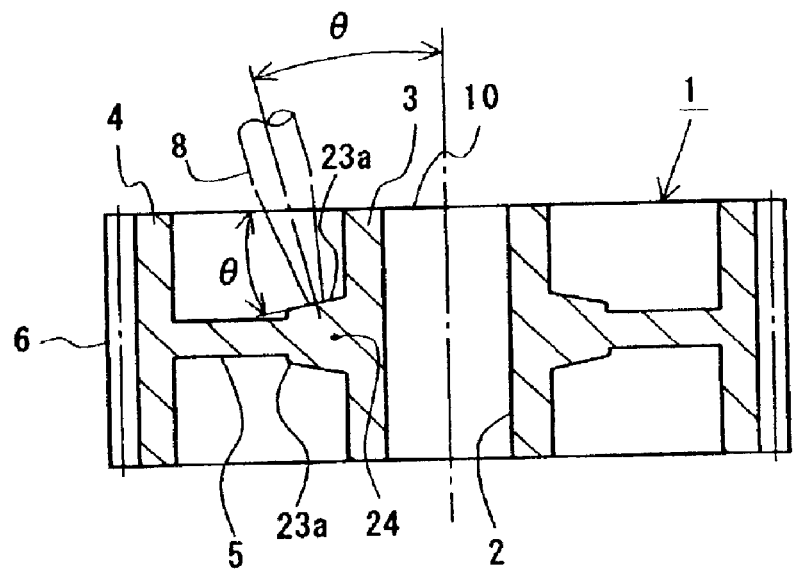
FIG. 13 is a sectional view of a third modified example of an injection molded resin gear in the second preferred embodiment.

FIG. 13 shows a third modified example in this preferred embodiment. The injection molded resin gear 11 shown in this figure is another modified example of the above described first modified example. In the third modified example, the sectional shapes of the ring-shaped portions 23a on both sides of the web 5 are the same. In this modified example, it is possible to obtain the same effects as those in the above described first modified example.

Figure 14:
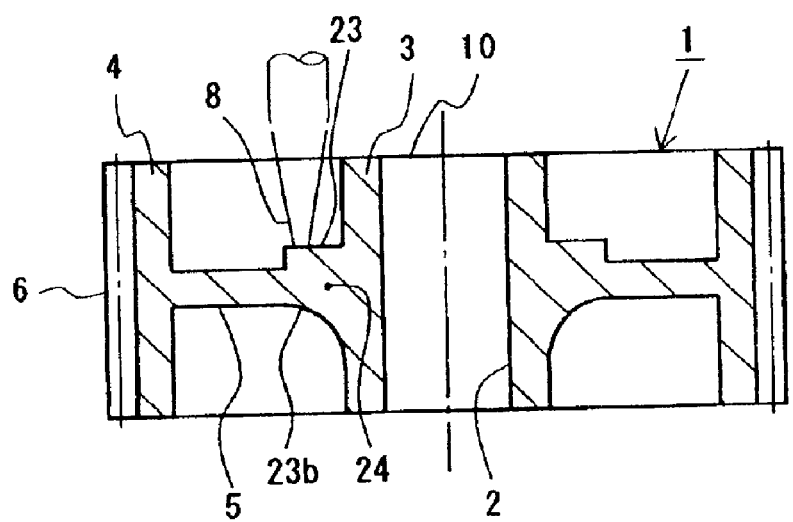
FIG. 14 is a sectional view of a fourth modified example of an injection molded resin gear in the second preferred embodiment.

FIG. 14 shows a fourth modified example in this preferred embodiment. In the injection molded resin gear 11 shown in this figure, the ring-shaped portion 23b formed on the lower side face of the web 5 in the figure has a substantially circular-arc-shaped cross section to improve the flowability of the molten resin. Also in this modified example, it is possible to obtain the same effects as those in this preferred embodiment.

Figure 15:
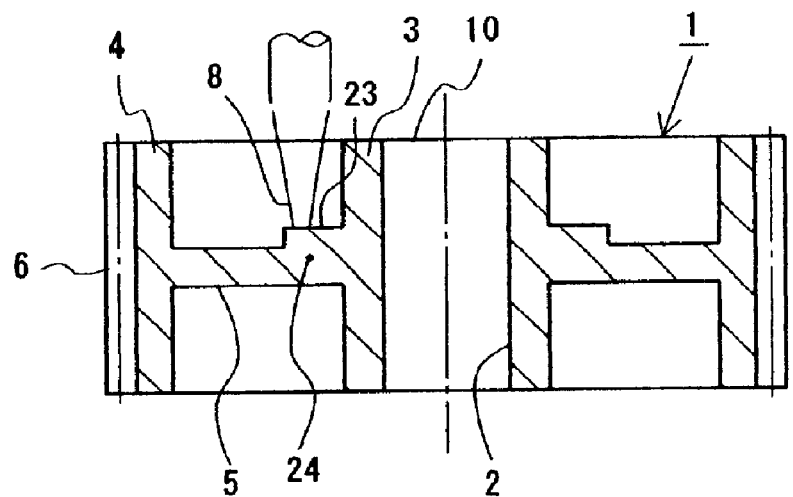
FIG. 15 is a sectional view of a fifth modified example of an injection molded resin gear in the second preferred embodiment.

FIG. 15 shows a fifth modified example in this preferred embodiment. In the injection molded resin gear 1 shown in this figure, the ring-shaped portion 23 is formed on only one side face of the web 5 (on the upper side face in the figure). In this modified example, the thickness of the thick-wall portion 24 is equal to the thickness of the thick-wall portion 24 in the second preferred embodiment, so that it is possible to obtain the same effects as those in the second preferred embodiment. Furthermore, the ring-shaped portion 23 may be formed on only the other side face of the web 5 (on the lower side face in the figure).

[Third Preferred Embodiment]

Figure 16:
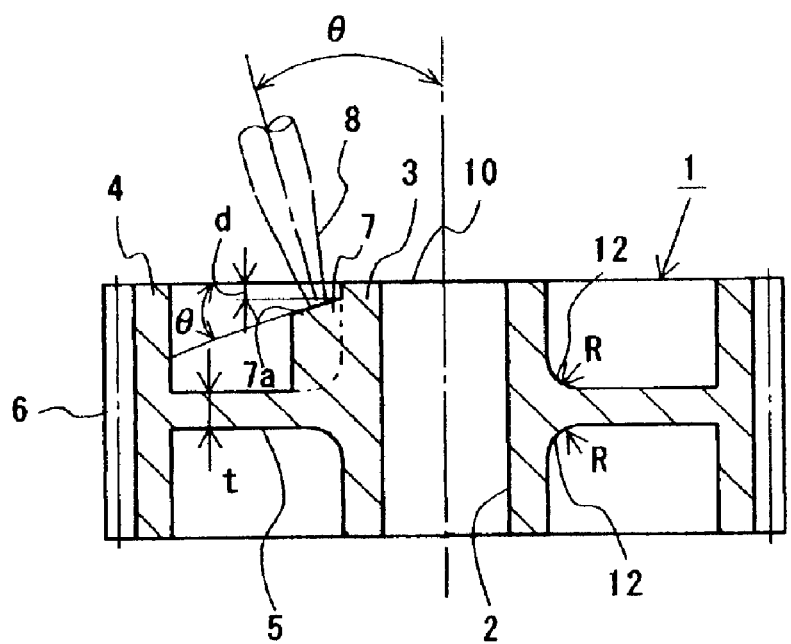
FIG. 16 is a sectional view of the third preferred embodiment of an injection molded resin gear according to the present invention.

FIG. 16 shows the third preferred embodiment of the present invention, and shows a modified example in the above described first preferred embodiment. In this preferred embodiment, the top face 7a of the rib 7 of the injection molded resin gear 1 shown in FIG. 2 tilts (by an angle θ) so as to be perpendicular to the injecting direction of the pin point gates 8 tilting by a predetermined angle θ.

According to this preferred embodiment with this construction, of course, it is possible to obtain the same effects as those in the above described first preferred embodiment. In addition, the opening portions of the pin point gates 8 can be closer to the hub 3, so that the molten resin injected from the pin point gates 8 can be more easily guided toward the hub 3.

The application of the present invention should not be limited to the injection molded resin gears 1 in the above described preferred embodiments. Similar to the above described injection molded resin gears 1, the present invention can be widely applied to injection molded resin rotating bodies, such as injection molded resin rollers and injection molded resin pulleys, which are formed by connecting an outer cylindrical portion (corresponding to the rim 4 in FIGS. 1 and 2) to an inner cylindrical portion (corresponding to the hub 3 in FIGS. 1 and 2) by a disk-shaped portion (corresponding to the web 5 in FIGS. 1 and 2). That is, if the above described rib (corresponding to the rib 7 in FIGS. 1 and 2) is formed on one side face of the disk-shaped portion of the injection molded rotating body and on the outer periphery of the inner cylindrical portion, the molten resin injected from the pin point gates (corresponding to the pin point gates 8 in FIGS. 1 and 2) can be guided by the rib toward the inner cylindrical portion to flow from the inner cylindrical portion toward the disk-shaped portion, similar to the above described injection molded resin gears 1. Therefore, it is possible to reduce weld lines, so that it is possible to provide a precision and inexpensive injection molded resin rotating body, such as an injection molded resin roller or an injection molded resin pulley.

The present invention may be applied to a precision and inexpensive injection molded article serving as a shaft supporting member or the like for supporting a movable shaft or a static shaft. That is, similar to the above described preferred embodiments and modified examples, the shaft supporting member serving as an injection molded article may comprise an outer cylindrical portion which is mounted on a frame or the like, an inner cylindrical portion which receives a shaft, a disk-shaped portion which connects the outer cylindrical portion to the inner cylindrical portion, and ribs 7 or ring-shaped portions 23, 23a, 23b which are formed so as to face pin point gates.

As described above, according to the present invention, the molten resin injected from the pin point gates can be guided toward the hub (the inner cylindrical portion) by the rib or thick-wall portion formed on the outer periphery of the hub (the inner cylindrical portion) on one side of the web (the disk-shaped portion), and can substantially uniformly flow from the hub (the inner cylindrical portion) toward the web (the disk-shaped portion), so that it is possible to provide a precision and inexpensive injection molded resin gear (injection molded resin rotating body, injection molded article) wherein weld lines are reduced.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An injection molded resin gear comprising:
   a rim;
   a hub;
   a web which connects the rim to the hub; and
   a rib protruding from an outer periphery of the hub in a radial direction and extending along the outer periphery of the hub from one side of the web to an end face in the facewidth directions,
   wherein a pin point gate faces said end face of said rib for allowing a molten resin to enter the rib to be guided to the hub when the injection molded resin gear is formed by injection molding.

2. An injection molded resin gear as set forth in claim 1, wherein a fillet portion for allowing the resin to smoothly flow from the hub to the web is formed on a connecting portion of the rib to the hub.

3. An injection molded resin gear as set forth in claim 1, wherein said rib has a radial length which is 6W or less assuming that a width of said rib W.

4. An injection molded resin gear as set forth in claim 1, wherein said rib has a radial length which is 3W or less assuming that a width of said rib W.

5. An injection molded resin gear comprising:

a rim;

a hub;

a web which connects the rim to the hub; and a ring-shaped portion extending from an outer periphery of the hub along at least one side of the web in a radial direction and protruding from the at least one side of the web to a ring-shaped surface so as to form a thick-wall portion of the web, wherein a pin point gate faces said ring-shaped surface of said ring-shaped portion for allowing a molten resin to enter the ring-shaped portion to be guided to the hub when the injection molded resin gear is formed by injection molding.

6. An injection molded resin rotating body comprising:

an outer cylindrical portion;

an inner cylindrical portion;

a disk-shaped portion which connects the outer cylindrical portion to the inner cylindrical portion; and a rib protruding from an outer periphery of the inner cylindrical portion in a radial direction and extending along the outer periphery of the inner cylindrical portion from one side of the disk-shaped portion to an end face in the facewidth directions, wherein a pin point gate faces said end face of said rib for allowing a molten resin to enter the rib to be guided to the inner cylindrical portion when the injection molded resin rotating body is formed by injection molding.

7. An injection molded resin rotating body comprising:

an outer cylindrical portion;

an inner cylindrical portion;

a disk-shaped portion which connects the outer cylindrical portion to the inner cylindrical portion; and a ring-shaped portion extending from an outer periphery of the inner cylindrical portion along at least one side of the disk-shaped portion in a radial direction and protruding from the at least one side of the disk-shaped portion to a ring-shaped surface so as to form a thick-wall portion of the disk-shaped portion, wherein a pin point gate faces said ring-shaped surface of said ring-shaped portion for allowing a molten resin to enter the ring-shaped portion to be guided to the inner cylindrical portion when the injection molded resin rotating body is formed by injection molding.

8. An injection molded article comprising:

an inner cylindrical portion;

an outer cylindrical portion which receives the inner cylindrical portion;

a disk-shaped portion which extends from the inner cylindrical portion to the outer cylindrical portion for connecting the inner cylindrical portion to the outer cylindrical portion; and a protruding portion which protrudes from the inner cylindrical portion toward the outer cylindrical portion in a radial direction of the injection molded article, said protruding portion extending along the inner cylindrical portion from the disk-shaped portion to an end face in an axial direction of the injection molded article so as to have such a height that said protruding portion is recessed from a side face of the inner cylindrical portion for defining a space adjacent to an axial end portion of the inner cylindrical portion, wherein each of a plurality of pin point gates is received in said space to face said end face of said protruding portion for allowing a molten resin to enter the protruding portion when the injection molded article is formed by injection molding.

9. An injection molded article as set forth in claim 8, wherein said protruding portion comprises a plurality of ribs, each of which extends in axial directions of said inner cylindrical portion.

10. An injection molded article as set forth in claim 9, which further comprises a fillet portion provided in a connecting portion in which each of said plurality of ribs is connected to said inner cylindrical portion.

11. An injection molded article as set forth in claim 9, wherein a radial length of each of said plurality of ribs in the radial direction of the injection molded article is six times or less as large as a width of said rib.

12. An injection molded article as set forth in claim 9, wherein a radial length of each of said plurality of ribs in the radial direction of the injection molded article is three times or less as large as a width of said rib.

13. An injection molded article as set forth in claim 8, wherein said protruding portion comprises a plurality of ribs which are arranged at regular intervals in circumferential directions of said inner cylindrical portion so as to extend in axial directions of said inner cylindrical portion.

14. An injection molded article as set forth in claim 13, which further comprises a fillet portion provided in a connecting portion in which each of said plurality of ribs is connected to said inner cylindrical portion.

15. An injection molded article as set forth in claim 13, wherein each of said plurality of ribs has a substantially C-shaped cross section.

16. An injection molded article as set forth in claim 13, wherein each of said plurality of ribs has a substantially rectangular cross section.

17. An injection molded article as set forth in claim 8, wherein said protruding portion is a ring-shaped portion which extends from said inner cylindrical portion toward said outer cylindrical portion in radial directions of the injection molded article so as to form a thick-wall portion on said disk-shaped portion.

18. An injection molded article as set forth in claim 17, wherein said end face of said ring-shaped portion opposite to said disk-shaped portion is inclined in accordance with a tilt angle of said pin point gate.

19. An injection molded article as set forth in claim 8, wherein said injection molded article is an injection molded resin gear rotated by a rotating shaft and which further comprises a plurality of teeth arranged on an outer periphery of said outer cylindrical portion.

20. An injection molded article as set forth in claim 8, wherein said injection molded article is an injection molded resin rotating body which is rotated by a rotating shaft.

* * * * *